(12) United States Patent
Bober

(10) Patent No.: US 7,257,277 B2
(45) Date of Patent: Aug. 14, 2007

(54) METHOD, APPARATUS, COMPUTER PROGRAM, COMPUTER SYSTEM AND COMPUTER-READABLE STORAGE FOR REPRESENTING AND SEARCHING FOR AN OBJECT IN AN IMAGE

(75) Inventor: Miroslaw Z. Bober, Surrey (GB)

(73) Assignees: Mitsubishi Electric Information Technology Centre Europe B.V., Rennes (FR); Mitsubishi Denki Kabushiki Kaisha, Tokyo (JP)

( * ) Notice: Subject to any disclaimer, the term of this patent is extended or adjusted under 35 U.S.C. 154(b) by 228 days.

(21) Appl. No.: 11/156,715

(22) Filed: Jun. 21, 2005

(65) Prior Publication Data

US 2005/0238236 A1 Oct. 27, 2005

Related U.S. Application Data

(62) Division of application No. 09/786,161, filed as application No. PCT/JP00/04401 on Jul. 3, 2000, now Pat. No. 6,931,154.

(30) Foreign Application Priority Data

Jul. 5, 1999 (GB) ................................. 9915699.4

(51) Int. Cl.
*G06K 9/54* (2006.01)
(52) U.S. Cl. .................. 382/305; 382/203; 382/209
(58) Field of Classification Search ................ 382/103, 382/181, 190, 199, 201, 203, 209, 218, 305; 358/403; 707/1–10
See application file for complete search history.

(56) References Cited

U.S. PATENT DOCUMENTS

| 4,989,257 | A | 1/1991 | Horowitz |
| 5,081,689 | A | 1/1992 | Meyer et al. |
| 5,119,439 | A | 6/1992 | Osawa et al. |
| 5,487,116 | A | 1/1996 | Nakano et al. |
| 6,014,461 | A | 1/2000 | Hennessey et al. |
| 6,182,069 | B1 | 1/2001 | Niblack et al. |
| 6,459,824 | B1 | 10/2002 | Lee et al. |
| 6,882,756 | B1 | 4/2005 | Bober |

FOREIGN PATENT DOCUMENTS

| EP | 0281725 A | 9/1988 |
| GB | 2203877 A | 10/1988 |
| JP | 6-309465 A | 11/1994 |

(Continued)

OTHER PUBLICATIONS

D. T. Nguyen, et al., 8049E I.E.E. Proceedings-E/Computers and Digital Techniques, vol. 135, No. 6, Part E., pp. 307-311, "Scale Based Algorithm for Recognition of Blurred Planar Objects," Nov. 1, 1988.

(Continued)

*Primary Examiner*—Daniel Mariam
(74) *Attorney, Agent, or Firm*—Birch, Stewart, Kolasch & Birch, LLP

(57) ABSTRACT

A method of representing an object appearing in a still or video image, by processing signals corresponding to the image, comprises deriving the peak values in CSS space for the object outline and applying a non-linear transformation to said peak values to arrive at a representation of the outline.

14 Claims, 6 Drawing Sheets

FOREIGN PATENT DOCUMENTS

| | | |
|---|---|---|
| JP | 10-55447 A | 2/1998 |
| WO | WO88/02158 A | 3/1988 |

OTHER PUBLICATIONS

F. Mokhtarian, et al. Machine Intelligence, vol. 14, No. 8, pp. 789-805, "A Theory of Multiscale, Curvature-Based Shape Representation for Planar Curves," Aug. 1, 1992.

S. Abbasi, et al., Lecture Notes in Computer Science, vol. 1252, pp. 284-295, "Reliable Classification of Chrysantehmum Leaves Through Curvature Scale Space," 1997.

B. Guensel, et al., Pattern Recognition, vol. 31, No. 7, pp. 931-944, "Shape Similarity Matching For Query-By-Example," Jul. 1, 1998.

F. Mokhtarian, et al., Lecture Notes in Computer Science, vol. 1311, p. 140-147, "A New Approach to Computation of Curvature Scale Space Image for Shape Similarity Retrieval," 1997.

N. Katzier, et al., Proceedings of the International Conference on Pattern Recognition, vol. Conf., No. 10, pp. 842-846, "Planar Curve Segmentation for Recognition of Partially Occluded Shapes," 1990.

Mokhtarian et al., Robust and Efficient Shape Indexing Through Curvature Scale Space, Proc. British Machine Vision Conference, pp. 53-62, Edinburgh, UK, 1996.

Mokhtarian et al., Indexing An Image Database by Shape Content Using Curvature Scale Space, Proc. IEE Colloquium on Intelligent Dastabases, London, 1995, pp. 4/1-4/5.

Farzin Mokhtarian, "Silhouette-Based Isolated Object Recognition through Curvature-Scale Space," IEEE Transactions on Pattern, Analysis and Machine Intelligence, vol. 17, No. 5, May 1995, pp. 539-544.

METHOD, APPARATUS, COMPUTER PROGRAM, COMPUTER SYSTEM AND COMPUTER-READABLE STORAGE FOR REPRESENTING AND SEARCHING FOR AN OBJECT IN AN IMAGE

This application is a Divisional of co-pending Application No. 09/786,161 (a National Stage Application based on PCT/JP00/04401 filed Jul. 3, 2000) filed on Mar. 2, 2001, and which is now U.S. Pat. No. 6,931,154 issued on Aug. 16, 2005, for which priority is claimed under 35 U.S.C. § 120; and this application claims priority of Application No. UK 9915699.4 filed in United Kingdom on Jul. 5, 1999 under 35 U.S.C. § 119; the entire contents of all are hereby incorporated by reference.

TECHNICAL FIELD

The present invention relates to the representation of an object appearing in a still or video image, such as an image stored in a multimedia database, especially for searching purposes, and to a method and apparatus for searching for an object using such a representation.

BACKGROUND ART

In applications such as image or video libraries, it is desirable to have an efficient representation and storage of the outline or shape of objects or parts of objects appearing in still or video images. A known technique for shape-based indexing and retrieval uses Curvature Scale Space (CSS) representation. Details of the CSS representation can be found in the papers "Robust and Efficient Shape Indexing through Curvature Scale Space" Proc. British Machine Vision conference, pp 53-62, Edinburgh, UK, 1996 and "Indexing an Image Database by Shape Content using Curvature Scale Space" Proc. IEE Colloquium on Intelligent Databases, London 1996, both by F. Mokhtarian, S. Abbasi and J. Kittler, the contents of which are incorporated herein by reference.

The CSS representation uses a curvature function for the outline of the object, starting from an arbitrary point on the outline. The curvature function is studied as the outline shape is evolved by a series of deformations which smooth the shape. More specifically, the zero crossings of the derivative of the curvature function convolved with a family of Gaussian filters are computed. The zero crossings are plotted on a graph, known as the Curvature Scale Space, where the x-axis is the normalised arc-length of the curve and the y-axis is the evolution parameter, specifically, the parameter of the filter applied. The plots on the graph form loops characteristic of the outline. Each convex or concave part of the object outline corresponds to a loop in the CSS image. The co-ordinates of the peaks of the most prominent loops in the CSS image are used as a representation of the outline.

To search for objects in images stored in a database matching the shape of an input object, the CSS representation of an input shape is calculated. The similarity between an input shape and stored shapes is determined by comparing the position and height of the peaks in the respective CSS images using a matching algorithm.

A problem with the known CSS representation is that the peaks for a given outline are based on the curvature function which is computed starting from an arbitrary point on the outline. If the starting point is changed, then there is a cyclic shift along the x-axis of the peaks in the CSS image. Thus, when a similarity measure is computed, all possible shifts need to be investigated, or at least the most likely shift. This results in increased complexity in the searching and matching procedure.

Accordingly the present invention provides a method of representing an object appearing in a still or video image, by processing signals corresponding to the image, the method comprising deriving a plurality of numerical values associated with features appearing on the outline of an object starting from an arbitrary point on the outline and applying a predetermined ordering to said values to arrive at a representation of the outline. Preferably, said values are derived from a CSS representation of said outline, and preferably they correspond to the CSS peak values.

It has been found that by applying a transformation, especially to CSS values, as in the invention, object retrieval performance is improved.

DISCLOSURE OF INVENTION

A method of representing an object appearing in a still or video image, by processing signals corresponding to the image set forth in claim 1, the method comprises deriving a plurality of numerical values representing features appearing on the outline of an object and applying a scaling or non-linear transformation to said values to arrive at a representation of the outline.

In a method set forth in claim 2, the numerical values reflect points of inflection on the outline.

A method set forth in claim 3 comprises deriving a curvature scale space representation of the outline by smoothing the outline in a plurality of stages using a smoothing parameter resulting in a plurality of outline curves, using values for feature points on each outline curve to derive curves characteristic of the original outline, and selecting the co-ordinates of peaks of said characteristic curves, wherein said transformation is applied to peak co-ordinate values.

In a method set forth in claim 4, the feature points relate to the curvature of each outline curve.

In a method set forth in claim 5, the feature points relate to the maxima and minima of the curvature of the outline curves.

A method of representing an object appearing in a still or video image, by processing signals corresponding to the image set forth in claim 6, the method comprises deriving a curvature scale space representation of the object outline, selecting co-ordinates for peaks in the curvature scale space, and applying a non-trivial transformation to peak co-ordinate values to arrive at a representation of the object outline.

In a method set forth in claim 7, the transformation is applied to the co-ordinate values corresponding to a smoothing parameter in the CSS representation.

In a method set forth in claim 8, the transformation is applied to the co-ordinate values corresponding to an arc-length parameter along the outline.

In a method set forth in claim 9, the transformation is a scaling transformation.

In a method set forth in claim 10, the transformation is a non-linear transformation.

In a method set forth in claim 11, the transformation is in the form of $z'=a \text{ pow }(z,b)+c$, where a, b and c are constants and $\text{pow}(z,b)$ denotes z to the power b.

In a method set forth in claim 12, b is greater than zero and less than 1.

In a method set forth in claim 13, b is in the range of $0.25 <= b <= 0.75$.

In a method set forth in claim 14, b=0.5.

A method for searching for an object in a still or video image by processing signals corresponding to images set forth in claim 15, the method comprises inputting a query in the form of a two-dimensional outline, deriving a descriptor of said outline using a method as claimed in any one of claims 1 to 10, obtaining a descriptor of objects in stored images derived using a method as claimed in any one of claims 1 to 10 and comparing said query descriptor with each descriptor for a stored object, and selecting and displaying at least one result corresponding to an image containing an object for which the comparison indicates a degree of similarity between the query and said object.

An apparatus set forth in claim 16 is adapted to implement a method as claimed in any one of claims 1 to 15.

A computer program set forth in claim 17 implements a method as claimed in any one of claims 1 to 15.

A computer system set forth in claim 18 is programmed to operate according to a method as claimed in any one of claims 1 to 15.

A computer-readable storage medium set forth in claim 19 stores computer-executable process steps for implementing a method as claimed in any one of claims 1 to 15.

A method of representing objects in still or video images set forth in claim 20 is described with reference to the accompanying drawings.

A method of searching for objects in still or video images set forth in claim 21 described with reference to the accompanying drawings.

A computer system set forth in claim 22 is described with reference to the accompanying drawings.

BEST MODE FOR CARRYING OUT THE INVENTION

FIRST EMBODIMENT

Figure 1:
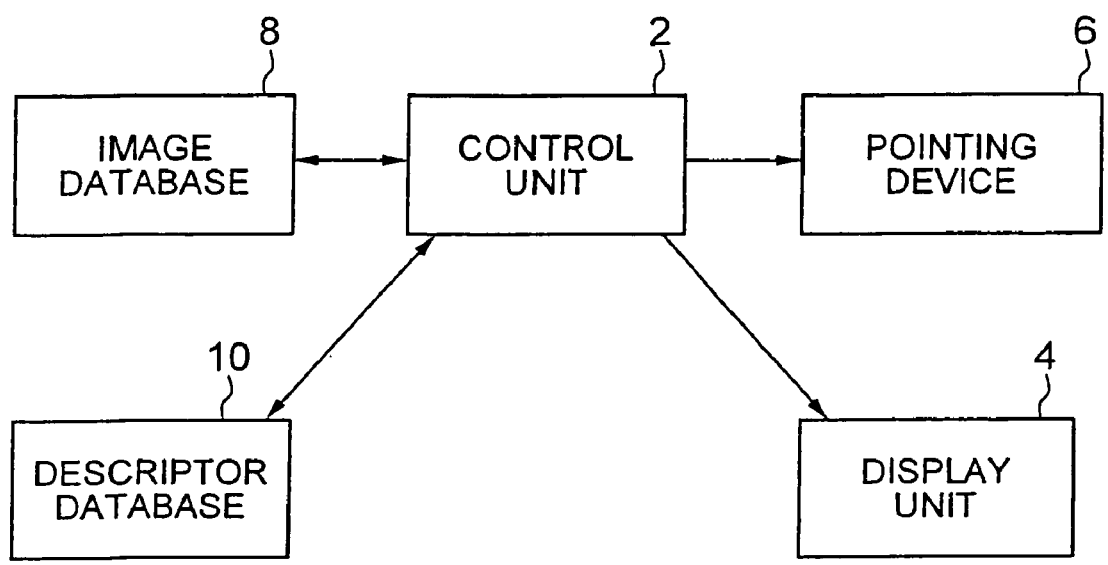
FIG. 1 is a block diagram of a video database system.

FIG. 1 shows a computerised video database system according to an embodiment of the invention. The system includes a control unit 2 in the form of a computer, a display unit 4 in the form of a monitor, a pointing device 6 in the form of a mouse, an image database 8 including stored still and video images and a descriptor database 10 storing descriptors of objects or parts of objects appearing in images stored in the image database 8.

A descriptor for the shape of each object of interest appearing in an image in the image database is derived by the control unit 2 and stored in the descriptor database 10. The control unit 2 derives the descriptors operating under the control of a suitable program implementing a method as described below.

Firstly, for a given object outline, a CSS representation of the outline is derived. This is done using the known method as described in one of the papers mentioned above.

More specifically, the outline is expressed by a representation $\Psi = \{(x(u), y(u), u\in[0, 1]\}$ where u is a normalised arc length parameter.

The outline is smoothed by convolving $\Psi$ with an 1D Gaussian kernel $g(u, \sigma)$, and the curvature zero crossings of the evolving curve are examined at $\sigma$ charges. The zero crossing are identified using the following expression for the curvature:

$$k(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}}$$

where $X(u, \sigma) = x(u) * g(u, \sigma)$  $Y(u, \sigma) = y(u) * g(u, \sigma)$ and $X_u(u, \sigma) = x(u) * g_u(u, \sigma)$  $X_{uu}(u, \sigma) = x(u) * g_{uu}(u, \sigma)$ Here * represents a convolution and the subscripts represent derivatives.

The number of curvature zero crossings changes as $\sigma$ changes, and when $\sigma$ is sufficiently high $\Psi$ is a convex curve with no zero crossings.

The zero crossing points are plotted on a graph, known as the CSS image space. This results in a plurality of characteristic curves. The peaks of the characteristic curves are identified and the corresponding co-ordinates are extracted and stored. In general terms, this gives a set of n co-ordinate pairs [(x1,y1), (x2,y2), ... (xn,yn)], where n is the number of peaks, and xi is the arc-length position of the ith peak and yi is the peak height.

In this embodiment, a binomial filter with coefficients (¼, ½, ¼) is used as an approximation of a Gaussian filter with some reduction of computational complexity. The reduction in computational complexity results from convenient filter coefficients which can be efficiently implemented on a DSP or a general-purpose processor.

The peak values, or in other words, the y-component values for the peaks, are then processed further. More specifically, the y values are transformed using the transformation:

$$y' = a\ pow(y,b) + c \qquad (1)$$

where pow(y,b) denotes y to the power b.

This results in a new set of peak values [(x1, y'1), (x2, y'2) ... (xn, y'n)], which values are stored in the descriptor database as a descriptor of the outline.

Figure 2:
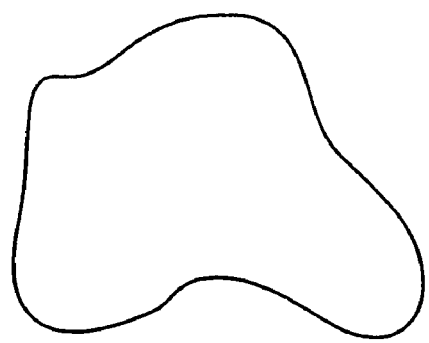
FIG. 2 is a drawing of an outline of an object.
Figure 3:
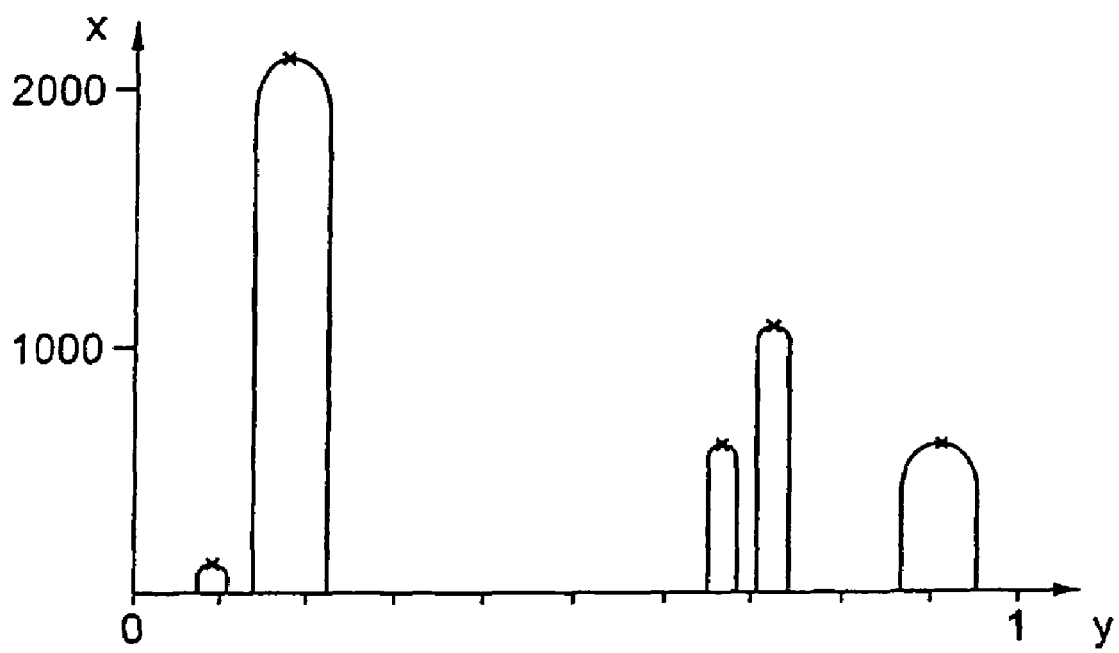
FIG. 3 is a CSS representation of the outline of FIG. 2.

As a specific example, the outline shown in FIG. 2 results in a CSS image as shown in FIG. 3. Details of the co-ordinates of the peaks of the curves in the CSS image are given in Table 1 below.

TABLE 1

| Peak Index | X | Y |
| --- | --- | --- |
| 1 | 0.124 | 123 |
| 2 | 0.68 | 548 |
| 3 | 0.22 | 2120 |
| 4 | 0.773 | 1001 |
| 5 | 0.901 | 678 |

The transformation given above is then applied, with a=6, b=0.5 and c=0. In other words, the square root of the original y value is taken and multiplied by a constant. This results in the following values:

TABLE 2

| Peak Index | X | Y |
|---|---|---|
| 1 | 0.124 | 67 |
| 2 | 0.68 | 140 |
| 3 | 0.22 | 276 |
| 4 | 0.773 | 190 |
| 5 | 0.901 | 156 |

Here, the values are rounded to the nearest integer, but other roundings can be used.

SECOND EMBODIMENT

Figure 4:
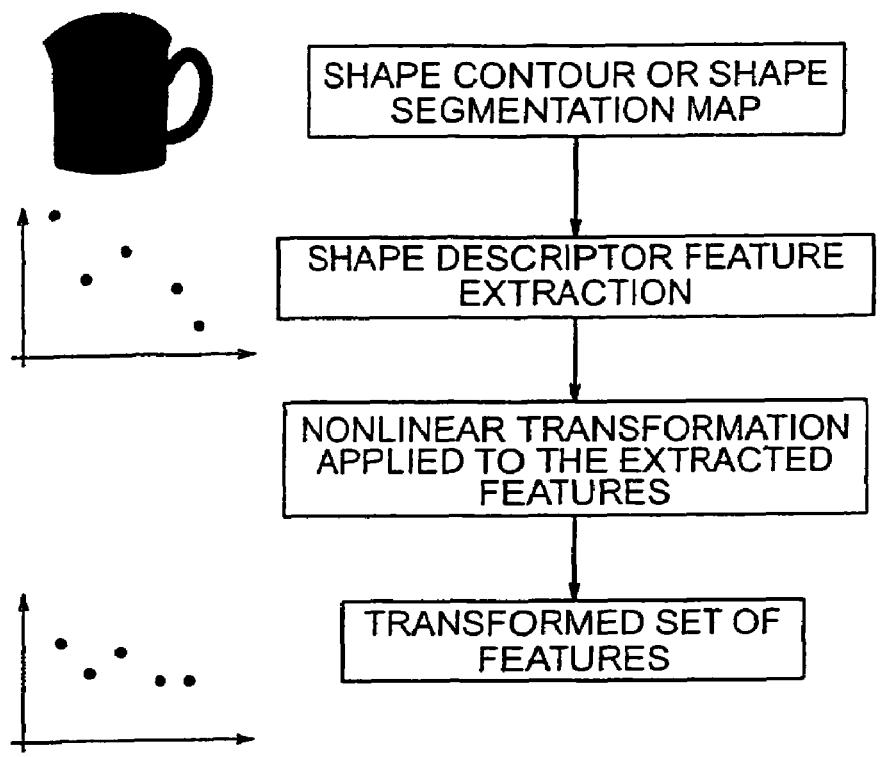
FIG. 4 is a diagram illustrating the representation of a shape.

Another example is shown in FIG. 4.

Figure 5:
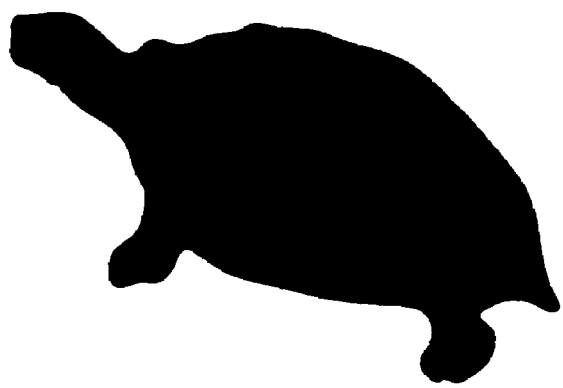
FIG. 5 is a drawing of the shape of an object.
Figure 6:
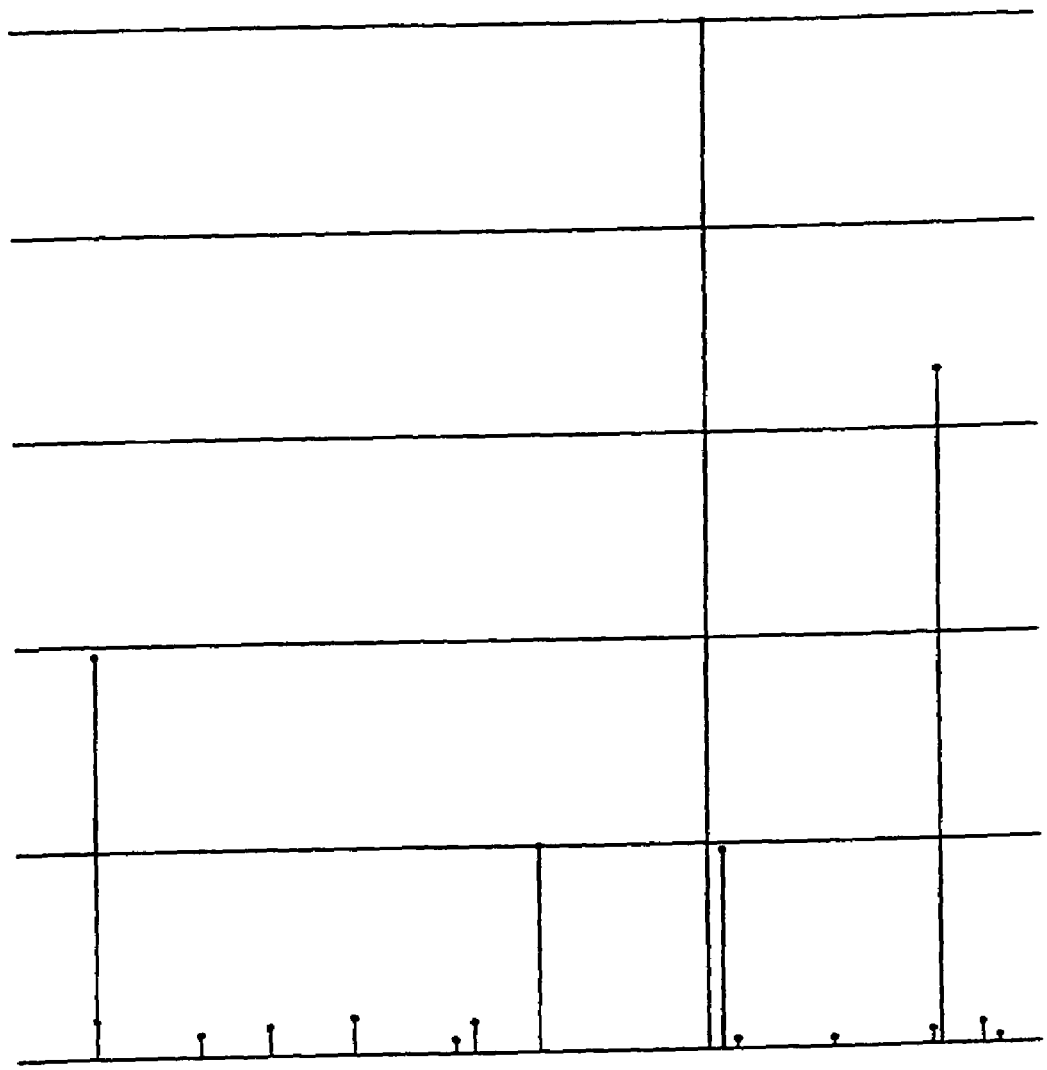
FIG. 6 is a CSS representation of the shape of FIG. 5.
Figure 7:
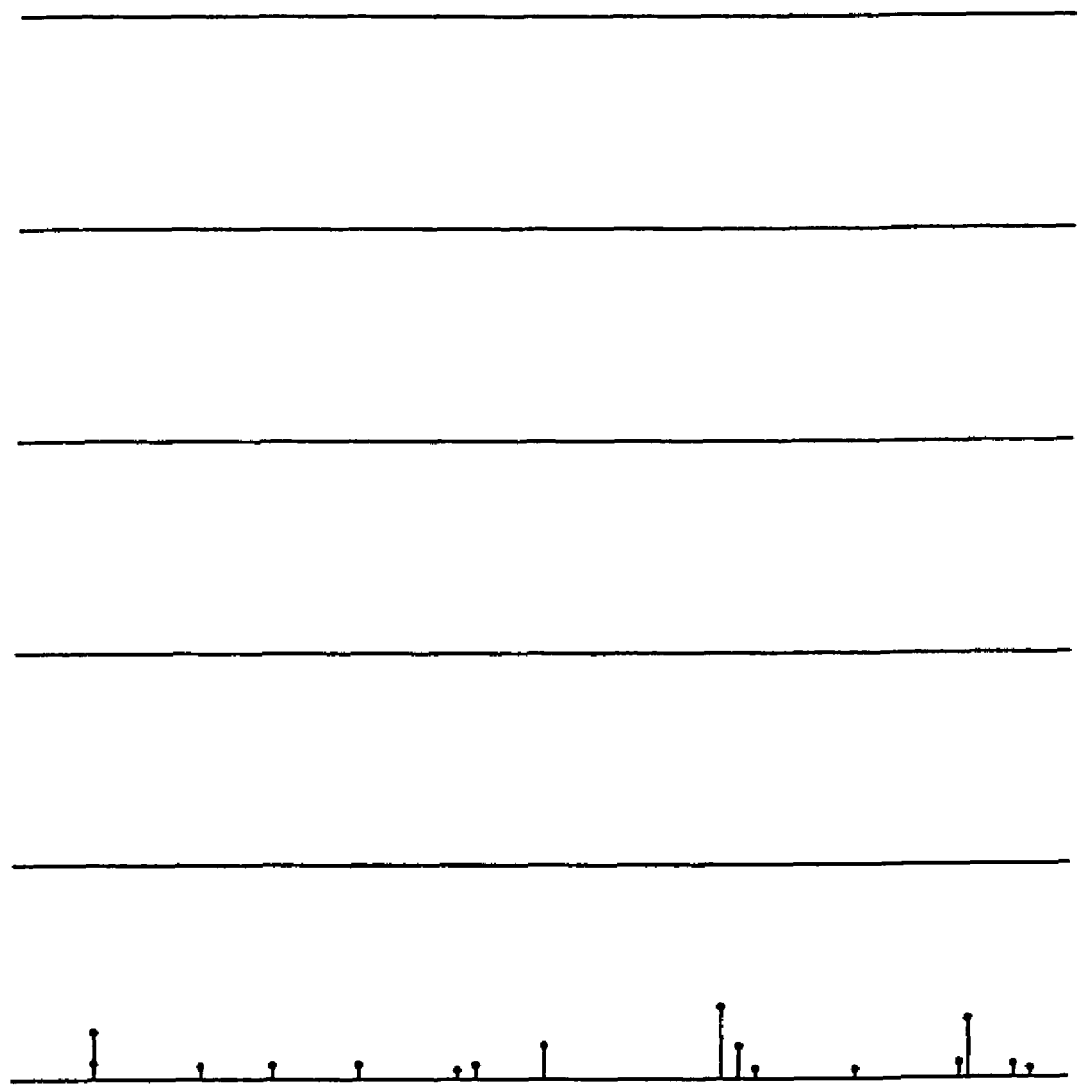
FIG. 7 is a transformed representation of the shape of FIG. 5.
Figure 8:
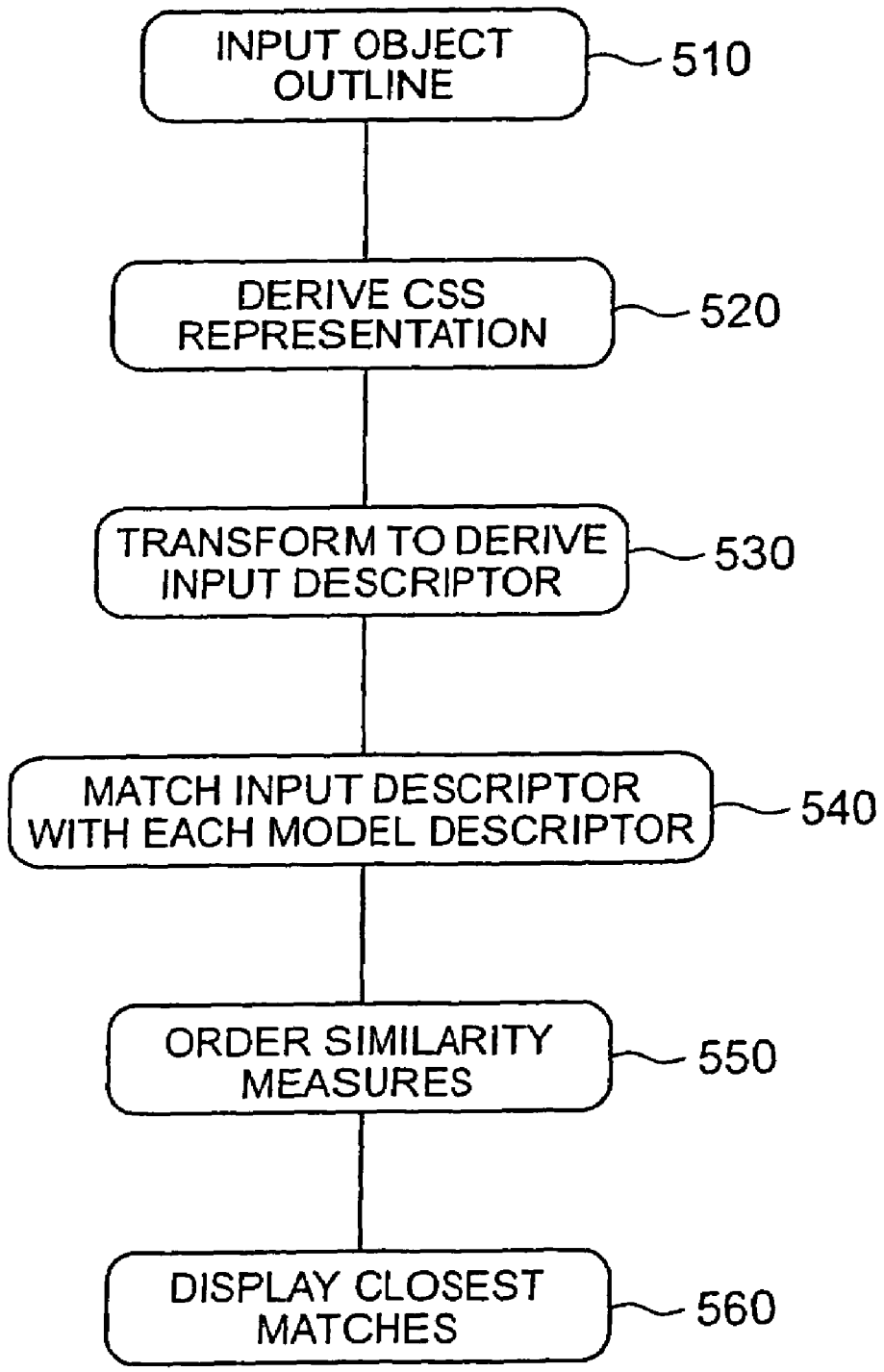
FIG. 8 is a block diagram illustrating a searching method.

FIG. 5 shows another example of an object shape, in this case a turtle. FIG. 6 shows the CSS peaks for the shape of FIG. 5. FIG. 7 shows the transformed peaks of FIG. 6, using the transformation given in equation (1) above, with a=6.5, b=0.5 and c=0.

The stored descriptors are used for searching purposes. The user initiates a search by drawing an object outline on the display using the pointing device (step 510). The control unit 2 then derives a CSS representation of the input outline (step 520) and then applies the transformation to the y values as described above (step 530). The resulting descriptor of the input outline is then compared with each stored descriptor in the descriptor database, known in the following as the model descriptors, using a known matching procedure (step 540).

The matching comparison is carried out using a suitable algorithm resulting in a similarity measure for each descriptor in the database. A known matching algorithm such as described in the above-mentioned papers can be used. That matching procedure is briefly described below.

Given two closed contour shapes, the image curve $\Psi i$ and the model curve $\Psi m$ and their respective sets of peaks $\{(xi1,yi1),(xi2,yi2), \ldots, (xin,yin)\}$ and $\{(xm1,ym1), (xm2,ym2), \ldots, (xmn,ymn)\}$ the similarity measure is calculated. The similarity measure is defined as a total cost of matching of peaks in the model into peaks in the image. The matching which minimises the total cost is determined using a dynamic programming. The algorithm recursively matches the peaks from the model to the peaks from the image and calculates the cost of each such match. Each model peak can be matched with only one image peak and each image peak can be matched with only one model peak. Some of the model and or image peak may remain unmatched, and there is an additional penalty cost for each unmatched peak. Two peaks can be matched if their horizontal distance is less then 0.2. The cost of a match is the length of the straight line between the two matched peaks. The cost of an unmatched peak is its height.

In more detail the algorithm works by creating and expanding a tree-like structure, where nodes correspond to matched peaks:

1. Create starting node consisting of the largest maximum of the image (xik, yik) and the largest maximum of the model (xir,yir).

2. For each remaining model peak which is within 80 percent of the largest maximum of the image peaks create an additional starting node.

3. Initialise the cost of each starting node created in 1 and 2 to the absolute difference of the y-coordinate of the image and model peaks linked by this node.

4. For each starting node in 3, compute the CSS shift parameter alpha, defined as the difference in the x (horizontal) coordinates of the model and image peaks matched in this starting node. The shift parameter will be different for each node.

5. For each starting node, create a list of model peaks and a list of image peaks. The list hold information which peaks are yet to be matched. For each starting node mark peaks matched in this node as "matched", and all other peaks as "unmatched".

6. Recursively expand a lowest cost node (starting from each node created in steps 1-6 and following with its children nodes) until the condition in point 8 is fulfilled. To expand a node use the following procedure:

7. Expanding a node:
   If there is at least one image and one model peak left unmatched:
   select the largest scale image curve CSS maximum which is not matched (xip,yip). Apply the starting node shift parameter (computed in step 4) to map the selected maximum to the model CSS image—now the selected peak has coordinates (xip-alpha, yip). Locate the nearest model curve peak which is unmatched (xms,yms). If the horizontal distance between the two peaks is less then 0.2 (i.e: |xip−alpha−xms|<0.2), match the two peaks and define the cost of the match as the length of the straight line between the two peaks. Add the cost of the match to the total cost of that node. Remove the matched peaks from the respective lists by marking them as "matched". If the horizontal distance between the two peaks is greater than 0.2, the image peak xip,yip) cannot be matched. In that case add its height yip to the total cost and remove only the peak xip,yip) from the image peak list by marking it as "matched".
   Otherwise (There are only image peaks or there are only model peaks left unmatched):
   Define the cost of the match as the height of the highest unmatched image or model peak and remove that peak from the list.

8. If after expanding a node in 7 there are no unmatched peaks in both the image and model lists, the matching procedure is terminated. The cost of this node is the similarity measure between the image and model curve. Otherwise, go to point 7 and expand the lowest cost node.

The above procedure is repeated with the image curve peaks and the model curve peaks swapped. The final matching value is the lower of the two.

As another example, for each position in the ordering, the distance between the input x value and the corresponding model x value and the distance between the input y value and the corresponding model y value are calculated. The total distance over all the positions is calculated and the smaller the total distance, the closer the match. If the number of peaks for the input and the model are different, the peak height for the leftovers is included in the total distance.

The above steps are repeated for each model in the database (step 480).

The similarity measures resulting from the matching comparisons are ordered (step 490) and the objects corresponding to the descriptors having similarity measures indicating the closest match (i.e. here the lowest similarity measures) are then displayed on the display unit 4 for the user (step 500). The number of objects to be displayed can be pre-set or selected by the user.

THIRD EMBODIMENT

An alternative embodiment will now be described. This embodiment is the same as the previous embodiment, except that a different transformation is used. More specifically, the y values are transformed using the transformation:

$$y'=a_0+a_1 y.$$

In other words, a linear, scaling, transformation is applied. Here, $a_0=41$, $a_1=0.19$.

In a variation, $a_0=0$ and $a_1=0.27$.

Different values of $a_0$ and $a_1$ can be used as appropriate.

The searching and matching procedure is essentially as described in the previous embodiment.

It has been found that applying a transformation, especially a linear transformation involving scaling or a non-linear transformation, as described above results in a descriptor which is less sensitive, eg to changes of shape outline within an object class, which consequently results in improved retrieval of objects.

In the embodiments described above, the transformation is applied to the CSS values before storing in the descriptor database 10. Alternatively, the CSS values can be stored in the database 10, and the transformation carried out as part of the searching process, before the matching procedure is performed.

In the described embodiments, the transformations are applied to the y-co-ordinate values. However, they may be applied to the x-co-ordinate values.

INDUSTRIAL APPLICABILITY

A system according to the invention may, for example, be provided in an image library. Alternatively, the databases may be sited remote from the control unit of the system, connected to the control unit by a temporary link such as a telephone line or by a network such as the internet. The image and descriptor databases may be provided, for example, in permanent storage or on portable data storage media such as CD-ROMs or DVDs.

Components of the system as described may be provided in software or hardware form. Although the invention has been described in the form of a computer system, it could be implemented in other forms, for example using a dedicated chip.

Specific examples have been given of methods of representing a 2D shape of an object, here, using CSS representation, and of methods for calculating values representing similarities between two shapes but any suitable such methods can be used.

The invention can also be used, for example, for matching images of objects for verification purposes, or for filtering.

The invention claimed is:

1. A method for searching for an object appearing in an image, comprising:
   receiving an input including at least one object having an outline;
   determining a curvature scale space representation for said input outline to generate a plurality of curves representative of said input outline;
   determining peaks and associated peak coordinates for said plurality of curves;
   generating a shape descriptor for said outline using a non-linear calculation applied to y-coordinate values of said peak coordinates;
   comparing said shape descriptor for said input outline to a shape descriptor for an image stored in memory to find at least one substantially matching image; and
   outputting said at least one substantially matching image.

2. A method as claimed in claim 1 wherein the transformation is applied to the co-ordinate values corresponding to a smoothing parameter in the CSS representation.

3. A method as claimed in claim 1 wherein said transformation is in the form of y'=a pow (y,b)+c, where a, b and c are constants and pow (y,b) denotes y to the power b.

4. A method as claimed in claim 3 wherein b is greater than zero and less than 1.

5. A method as claimed in claim 3 wherein b is in the range of 0.25<=b<=0.75.

6. A method as claimed in claim 5 wherein b=0.5.

7. An apparatus configured to implement a method as claimed in claim 1.

8. A computer system programmed to operate according to a method as claimed in claim 1.

9. A computer-readable storage medium storing computer-executable process steps for implementing a method as claimed in claim 1.

10. A system for searching for an object appearing in an image, comprising:
    an input device for inputting and least one object having an outline;
    a controller and a detector for receiving said input object having an outline and determining a curvature scale space representation for said input outline to generate a plurality of curves representative of said input outline, and for determining peaks and associated peak coordinates for said plurality of curves;
    wherein said controller to generate a shape descriptor for said outline using a non-linear calculation applied to y-coordinate values of said peak coordinates;
    a comparator for comparing said shape descriptor for said input outline to a shape descriptor for an image stored in memory to find at least one substantially matching image; and
    a display for displaying said at least one substantially matching image.

11. A method for searching an image applied to a comparator in a search system as claimed in claim 10, comprising:
    receiving a first shape descriptor for an object in said image, said shape descriptor including a plurality of peak coordinates for a curvature scale space (CSS) representation of an outline of said object, said peak coordinates of said CSS representation are generated by smoothing said outline in a plurality of stages, each of said peak coordinates including a y-coordinate value being applied a non-linear calculation; and
    comparing said first shape descriptor for said object to a second shape descriptor for an image stored in memory to find at least one substantially matching image, wherein each of said peak coordinates is compared to corresponding coordinate of said second shape descriptor in said memory.

12. A method for searching an image applied to a controller in a search system as claimed in claim 10, comprising:
    generating peak coordinates for a curvature scale space (CSS) representation of an outline of an object in said image by smoothing said outline in a plurality of stages;
    applying a non-linear calculation to y-coordinates of said peak coordinates to generate a shape descriptor for said object;
    transmitting said shape descriptor to a comparator to search at least one substantially matching image; and receiving, from said comparator, and displaying said one substantially matching image.

13. A machine-readable medium having stored thereon a plurality of executable instructions, the plurality of instructions comprising instructions to receive an input including at least one object having an outline;

determine a curvature scale space representation for said input outline to generate a plurality of curves representative of said input outline;

determine peaks and associated peak coordinates for said plurality of curves;

generate a shape descriptor for said outline using a non-linear calculation applied to y-coordinate values of said peak coordinates;

compare said shape descriptor for said input outline to a shape descriptor for an image stored in memory to find at least one substantially matching image; and output said at least one substantially matching image.

14. A method for searching for an object in an image or sequence of images by processing signals corresponding to images, the method comprising inputting a query in the form of a two-dimensional outline, deriving a descriptor of said outline, obtaining a descriptor of objects in stored images and comparing said query descriptor with each descriptor for a stored object, and selecting and displaying at least one result corresponding to an image containing an object for which the comparison indicates a degree of similarity between the query and said object, wherein the descriptors of the query outline and/or stored object outline are derived by deriving a plurality of co-ordinate values for peaks in curvature scale space (CSS) representing features appearing on the outline and applying a non-linear transformation to the peak height co-ordinate values to arrive at a representation of the outline.

* * * * *

UNITED STATES PATENT AND TRADEMARK OFFICE
CERTIFICATE OF CORRECTION

| | |
|---|---|
| PATENT NO. | : 7,257,277 B2 |
| APPLICATION NO. | : 11/156715 |
| DATED | : August 14, 2007 |
| INVENTOR(S) | : Miroslaw Z. Bober |

It is certified that error appears in the above-identified patent and that said Letters Patent is hereby corrected as shown below:

On The Title Page, Item (73), second assignee should read -- MITSUBISHI DENKI KABUSHIKI KAISHA --.

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,257,277 B2 | |
| APPLICATION NO. | : 11/156715 | |
| DATED | : August 14, 2007 | |
| INVENTOR(S) | : Miroslaw Z. Bober | |

It is certified that error appears in the above-identified patent and that said Letters Patent is hereby corrected as shown below:

Title of the Specification:

The Title reading "METHOD, APPARATUS, COMPUTER PROGRAM, COMPUTER SYSTEM AND COMPUTER READABLE STORAGE FOR REPRESENTING AND SEARCHING FOR AN OBJECT IN AN IMAGE" should read --METHOD AND DEVICE FOR DISPLAYING OR SEARCHING FOR AN OBJECT IN IMAGE AND COMPUTER-READABLE STORAGE MEDIUM--

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,257,277 B2
APPLICATION NO. : 11/156715
DATED : August 14, 2007
INVENTOR(S) : Miroslaw Z. Bober It is certified that error appears in the above-identified patent and that said Letters Patent is hereby corrected as shown below:

Title of the Specification:
Item [54] and Column 1, lines 1-5,
The Title reading "METHOD, APPARATUS, COMPUTER PROGRAM, COMPUTER SYSTEM AND COMPUTER READABLE STORAGE FOR REPRESENTING AND SEARCHING FOR AN OBJECT IN AN IMAGE" should read --METHOD AND DEVICE FOR DISPLAYING OR SEARCHING FOR AN OBJECT IN IMAGE AND COMPUTER-READABLE STORAGE MEDIUM--

This certificate supersedes the Certificate of Correction issued December 9, 2008.

Signed and Sealed this

Thirtieth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,257,277 B2  Page 1 of 1
APPLICATION NO. : 11/156715
DATED : August 14, 2007
INVENTOR(S) : Miroslaw Z. Bober It is certified that error appears in the above-identified patent and that said Letters Patent is hereby corrected as shown below:

On The Title Page, Item (73), assignee should read -- MITSUBISHI DENKI KABUSHIKI KAISHA --.

This certificate supersedes the Certificate of Corrected issued October 7, 2008.

Signed and Sealed this

Third Day of February, 2009

JOHN DOLL
*Acting Director of the United States Patent and Trademark Office*